UNITED STATES PATENT OFFICE.

BASILE ST. JEAN, OF MANCHESTER, NEW HAMPSHIRE.

IMPROVEMENT IN ROOFING COMPOSITIONS.

Specification forming part of Letters Patent No. 162,503, dated April 27, 1875; application filed April 3, 1875.

*To all whom it may concern:*

Be it known that I, BASILE ST. JEAN, of Manchester, Hillsborough county, in the State of New Hampshire, have invented an Improvement in Composition for Roofing; and I hereby declare the following to be a full and exact description thereof.

My invention consists of a mixture of coal-tar, coal-ashes, and sawdust, spread upon felt or roofing-paper and covered with gravel.

During many years' experience in making roofs containing coal-tar, I have found two great difficulties, owing to the extremes of weather and the nature of the materials: first, running or melting by heat, and, second, cracking by cold. After many experiments with various kinds of material and especially with sawdust as one ingredient, I have succeeded in making roofs which will stand the changes of climate in New Hampshire, and in my opinion far superior to ordinary roofs made of similar material.

In order to enable others to make and use my composition for roofing, I proceed to describe the same as follows:

Take well dried sawdust and carefully sift the same, so as to obtain the finest portions. Also, take coal-ashes perfectly dried and sift them in the same manner. Now, take equal parts of this fine sawdust and fine coal-ashes and mix them well together in the dry state. Then take a good thick article of coal-tar and thoroughly stir into it an equal quantity of the mixture of coal-ashes and sawdust, thus making the following proportion of ingredients: One part sawdust, one part coal-ashes, and two parts coal-tar.

In cold weather it is necessary to warm the coal-tar before mixing the ingredients, and the mixture must also be warmed in order to spread the same upon the roof or paper-felt. It is very important to avoid rain or water, in order to make the sawdust mix well with the coal-tar. One great object of the sawdust is to absorb and retain the more volatile parts of the coal-tar, and thus prevent the mixture from flowing by summer-heat, and at the same time to give toughness to the mixture and prevent cracking in winter or by time. After this composition is spread upon the roof or felt-paper, a coat of gravel should be added in the usual way.

I claim—

The above-described composition of matter as a roofing material, to be used in combination with roofing-paper and gravel, substantially as and for the purposes set forth.

BASILE ST. JEAN.

Witnesses:
 ISAAC N. RIDDLE,
 B. P. CILLEY.